(12) United States Patent
Brancaleone et al.

(10) Patent No.: US 10,150,354 B2
(45) Date of Patent: Dec. 11, 2018

(54) AUTOMOTIVE DOOR STRUCTURE FOR SAIL MOUNTED MIRRORS

(71) Applicant: FORD GLOBAL TECHNOLOGIES, LLC, Dearborn, MI (US)

(72) Inventors: Robert Anthony Brancaleone, Farmington Hills, MI (US); Matthew Ammons, Plymouth, MI (US); Prashant Agrawal, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 704 days.

(21) Appl. No.: 14/186,378

(22) Filed: Feb. 21, 2014

(65) Prior Publication Data
US 2015/0239327 A1    Aug. 27, 2015

(51) Int. Cl.
*B60J 5/04*    (2006.01)
*B60R 1/06*    (2006.01)

(52) U.S. Cl.
CPC .......... *B60J 5/0468* (2013.01); *B60J 5/0404* (2013.01); *B60R 1/06* (2013.01)

(58) Field of Classification Search
CPC .......... B60R 1/06; B60J 5/0468; B60J 5/0404
See application file for complete search history.

(56) References Cited

U.S. PATENT DOCUMENTS

| | | | | |
|---|---|---|---|---|
| 2,775,919 A | * | 1/1957 | Fischer | 248/479 |
| 4,200,327 A | * | 4/1980 | Wepler | 296/91 |
| 4,790,590 A | * | 12/1988 | Ito et al. | 296/146.1 |
| 4,831,710 A | * | 5/1989 | Katoh et al. | 29/434 |
| 4,936,537 A | * | 6/1990 | Namba et al. | 248/475.1 |
| 5,473,476 A | * | 12/1995 | Fujita | 359/872 |
| 5,735,163 A | * | 4/1998 | Sato et al. | 72/348 |
| 2002/0046505 A1 | * | 4/2002 | Seksaria et al. | 49/502 |
| 2002/0085296 A1 | * | 7/2002 | Hattori | 359/872 |
| 2002/0166222 A1 | * | 11/2002 | Kojima et al. | 29/421.1 |
| 2004/0129853 A1 | * | 7/2004 | Suzuki et al. | 248/475.1 |
| 2005/0028894 A1 | * | 2/2005 | Hoffmann et al. | 148/417 |
| 2010/0265603 A1 | * | 10/2010 | Herrmann | 359/871 |

(Continued)

FOREIGN PATENT DOCUMENTS

| | | | | |
|---|---|---|---|---|
| CN | 201901070 U | 7/2011 | | |
| DE | 102006058109 A1 | * | 6/2008 | B60R 1/06 |
| DE | 102009019903 A1 | * | 11/2010 | B60R 1/06 |

(Continued)

OTHER PUBLICATIONS

Translation of foreign document DE 10 2006 058 019 (Futterer).*

*Primary Examiner* — Jason S Morrow
(74) *Attorney, Agent, or Firm* — Jason Rogers; Brooks Kushman, P.C.

(57) ABSTRACT

A vehicle door assembly includes a door structure having an inner panel and an outer panel defining an internal cavity that extends about a window surround above a vehicle waistline. The door assembly further defines mirror attachment holes and a plurality of collars affixed within the internal cavity. Each collar defines a bore in alignment with a mirror attachment hole of the door structure. The door assembly also includes a mirror assembly having a plurality of protruding fasteners attached to the door structure. The protruding fasteners compressively sandwich the collars within the internal cavity.

14 Claims, 3 Drawing Sheets

(56) References Cited

U.S. PATENT DOCUMENTS

2013/0062496 A1    3/2013   Niessen et al.

FOREIGN PATENT DOCUMENTS

| DE | 102010061112 A1 | * | 6/2012 | ............... B60R 1/06 |
| DE | 102012106882 A1 | * | 1/2014 | ............... B60R 1/06 |
| JP | 2007284015 A | * | 11/2007 | ............ B62D 25/08 |
| JP | 2007-331460 A | | 12/2007 | |
| JP | 2012-056496 A | | 3/2012 | |
| JP | 2013-063686 A | | 11/2013 | |

* cited by examiner

AUTOMOTIVE DOOR STRUCTURE FOR SAIL MOUNTED MIRRORS

TECHNICAL FIELD

This disclosure relates to mounting structures for outside mirrors assembled to vehicle doors.

BACKGROUND

The location of an outside mirror of a vehicle often involves several competing factors. Aesthetics, driver visibility, noise and vibration management each play a role. The reflective face of the mirror is located relative to the field of view of the driver to provide optimal visibility. This location is commonly above the waistline of the vehicle and near a forward portion of the window surround of the front door of the vehicle.

The position of the reflective face of the side mirror limits the options for location of mirror attachments to the door assembly. One option is to attach the mounting structure of the side mirror assembly to a sail area of the door. The sail area is often triangular when viewed from the side. The triangular shape creates space constraints with respect to the space available for mirror attachments. A formation or depression can be provided in one or more door panels to create a flat condition suitable for receiving clamp load from a threaded joint of the mirror attachment. Flat configurations may have reduced stiffness and are prone to deflection in response to loads applied via the attached mirror. In some configurations, multiple panels converge to accommodate mirror attachment points, locally reducing cross-sectional area and strength of the door.

Alternatively, large clearance holes can be formed in secondary panels to solidly clamp the mirror to a flat portion of one primary panel. Clamping to one panel allows for a desired cross-sectional area, but the large clearance hole required to accommodate the mirror can weaken the door frame near the attachment location. Less than optimal point stiffness may be provided when mirror attachments are secured to only a single panel.

Customer usage may result in a number of different loads being imparted to an outside mirror. For example, vehicle driving modes and door slams may apply different loads to the mirror. Sufficient mounting stiffness is required to avoid excessive movement or vibration of the outside mirror caused by the different loads. Heavy gage reinforcement panels may be required to augment the door structure to limit mirror vibration. In some cases, the overall thickness of one or more door panels must be increased to provide requisite mounting stiffness.

This disclosure is directed to solving the above problems and other problems as summarized below.

SUMMARY

According to one aspect of this disclosure, a vehicle door assembly includes an inner panel, and an outer panel attached to the inner panel to define an internal cavity that extends about a window surround. The door assembly defines mirror attachment holes and a plurality of collars each defining a bore, and disposed within the internal cavity. The door assembly also includes a mirror assembly including a plurality of fasteners extending through the bores of the collars to secure the mirror assembly on the door assembly.

According to another aspect of this disclosure, a door structure defines a waistline partitioning a window opening from a lower door portion. The door structure includes an outer panel defining a mirror sail area at a forward portion of the panel above the waistline. The door structure also includes an inner panel joined to the outer panel at a plurality of locations that has a perimeter shape corresponding to the outer panel. At least one collar is affixed within a lateral gap defined between the outer panel and the inner panel in the mirror sail area. The collar is configured to receive a threaded stud of an outside mirror protruding inwardly through the outer panel, the collar, and the inner panel.

According to a further aspect of this disclosure, a door assembly includes a door structure having an inner panel and an outer panel that define a waistline and a sail area at a forward location above the waistline. A plurality of collars is affixed in a gap between the inner and outer panels at the sail area. The door assembly also includes a mirror assembly that has a plurality of threaded fasteners protruding through each of the collars to retain the mirror to the door structure.

The above aspects of this disclosure and other aspects are described below in greater detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
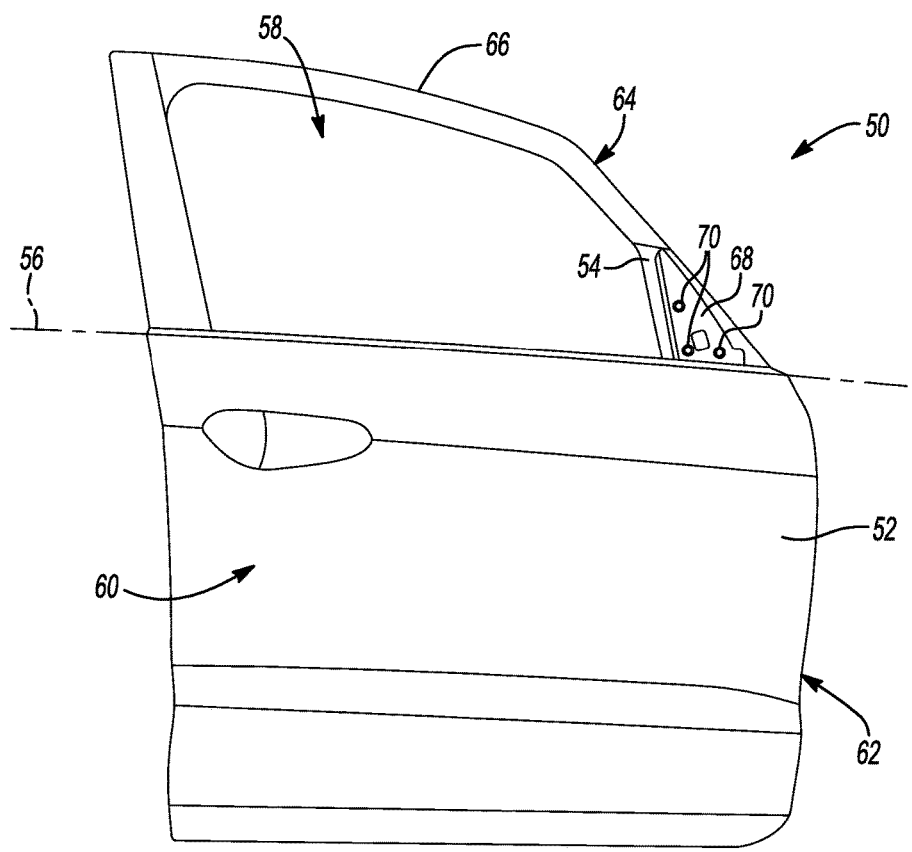
FIG. 1 is a side elevation view of the outside of a vehicle door assembly.

FIG. 1 is a side view of the outside a vehicle door assembly 50 made according to at least one embodiment of the present disclosure. The door assembly comprises a lower outer panel 52 and an upper outer panel 54. A lower inner panel 62 and an upper inner panel 64 mate to the outer panels 52, 54 respectively. The lower and upper inner panels 62, 64 are joined to each other near a waistline 56 (also known as a beltline) of the vehicle that separates an upper greenhouse portion and a lower portion of the vehicle. The waistline 56 partitions the door assembly 50 and separates the window opening 58 from the lower door portion 60. The four panels are also joined to each other at a plurality of locations, including locations around the perimeter of the door assembly 50. The main panels are assembled together to make up the basic structure of the door. Alternatively, the lower and upper inner panels 62, 64 or the lower and upper outer panels 52, 54 may be formed by a single inner or outer panel.

The inner and outer panels are joined at the perimeter and create internal cavities between the panels. A first internal cavity between the lower outer and inner panels 52, 62 houses window mechanisms, door latching hardware, and other door components. A second internal cavity is defined by the upper inner panel 64 and upper outer panel 54 above the waistline 56. The second internal cavity above the vehicle waistline 56 is significantly smaller when compared to the cavity below the waistline 56 due to the configuration of the upper door frame 66. The door frame 66, including the second internal cavity, extends about the window opening 58. The door frame 66 generally approximates a tubular structure having a hollow cross-section. The maximum bending and torsional stresses to be withstood by the tubular structure are a function of the dimensions of the cross-sectional area. The stiffness of the upper door frame 66 may be enhanced by maintaining a continuous closed section and minimizing stress risers related to large surface formations and holes.

An area for receiving an outside mirror is provided at a forward mirror sail region 68 of the door assembly 50. Attachment holes 70 are formed through the door assembly 50 for receiving attachment features to retain an outside mirror. The attachment features may comprise fasteners protruding from an inboard face of the outside mirror. In one example, the mirror is provided with threaded studs that protrude through the door assembly and are retained by corresponding threaded retaining nuts on the opposing side of the door assembly 50. A retaining nut is received on each threaded stud of the mirror creating threaded joints at each attachment location. The threaded joints permit a clamp load to be applied across the upper outer panel 54 and upper inner panel 64. The performance and longevity of the threaded joints are influenced by the rigidity of the door surfaces clamped by the threaded joint. A highly rigid surface avoids flexing that may cause relaxation and loss of clamp load. Also, inadequate local stiffness of the supporting door structure at the mirror attachments may allow excessive vibration of the mirror structure from vehicle service loads.

Figure 2:
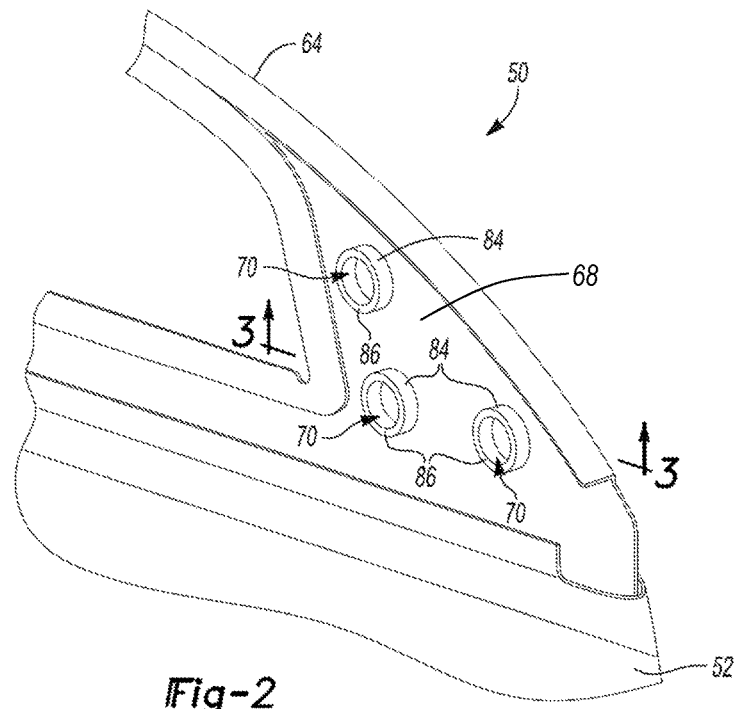
FIG. 2 is a fragmentary outside perspective view of a door inner panel having attachment collars.

FIG. 2 is an outside perspective view of the mirror sail region 68 of the door assembly 50 with the upper outer panel 54 removed for illustration purposes. A plurality of collars 84 are provided that correspond to each of the mirror attachment holes 70 in the upper inner panel 64. Each of the collars 84 defines an internal bore 86. The collars 84 are aligned with the attachment holes 70 such that a bore 86 of each collar 84 is coaxial with each hole. The collars 84 are structural, and each has a length corresponding to a lateral gap of the second internal cavity between the upper inner panel 64 and the upper outer panel 54. The collars 84 may be sub-assembled to either the outer panel 54 or the inner panel 64 prior to the complete assembly of the door 50. The span of the lateral gap between the panels is set by the collars 84 during the construction of the door assembly 50. The collars may be affixed to the upper outer panel 54 or the upper inner panel 64, for example by welding, and abutted against the other panel. Although the collars are depicted as cylindrical, or tubular, alternative shapes may be suitable according to the present disclosure.

Figure 3:
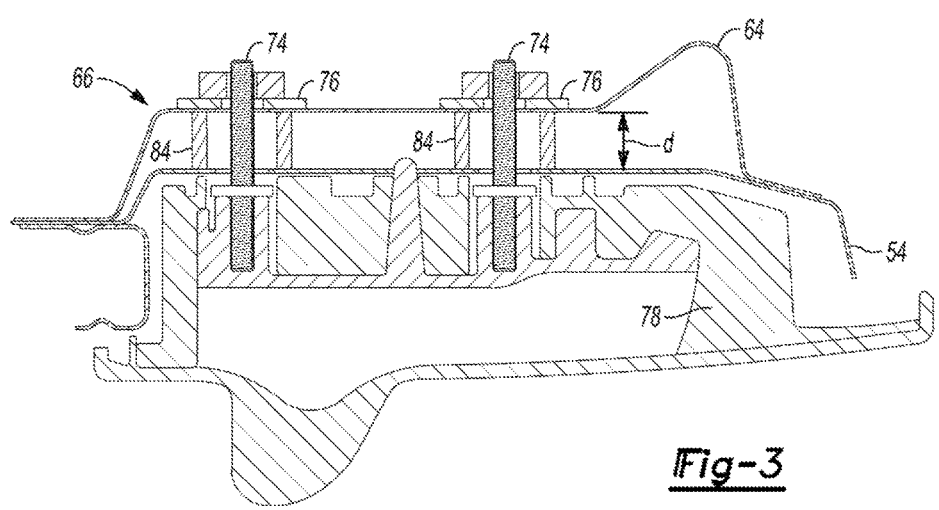
FIG. 3 is a cross-section through an outside mirror attachment taken along line 3-3 of FIG. 2.

FIG. 3 is a cross-section through an assembled vehicle door system taken along line 3-3 of FIG. 2. Each of the collars 84 is provided with a length corresponding to a distance "d" between the outer panel 54 and inner panel 64. The collars 84 are affixed within the internal cavity of the door frame 66. Threaded studs 74 of an outside mirror 78 may be elongated by at least the distance "d" to span across the lateral gap and engage both panels. In one example, the collars 84 are about 10 mm in length. Alternative lengths may also be utilized to further increase the depth of the cross-section at the mirror attachment points. Threaded retaining nuts 76 are affixed to the studs 74 on the opposite side of the door frame 66 for applying a clamp load across the threaded joint. The collars 84 have sufficient wall thickness to avoid buckling or appreciable deformation when subjected to the compressive clamp load applied by the threaded joint. The collars 84 create a local box section at each threaded joint that adds local stiffness at each attachment point.

With continued reference to FIG. 3, the collars 84 allow the cross-sectional area of the door frame 66 to be substantially maintained through each attachment point. The increased area of the door frame 66 contributes to increased frame stiffness compared to a door assembly having a large formation, depression, or clearance hole as discussed above. The attachment collars avoid weak points induced by large holes or formations in one or more of the door panels for accommodating the threaded joint. The improved structure of the present disclosure may significantly reduce, or avoid altogether, the need for a separate mirror reinforcement part to provide adequate local attachment stiffness in the mirror sail area. The collars 84 may be used to provide equivalent stiffness using thinner gage panels, thereby providing a vehicle weight savings. For example, both of the upper outer panel 54 and the upper inner panel 62 may be stamped steel, each having a panel thickness less than or equal to about 0.7 mm. Alternate panel materials and formation methods may also be suitable to employ the disclosed mirror attachment configuration. The disclosed mirror attachment configurations may also facilitate the use of other structural materials used in vehicle door construction, such as aluminum, magnesium, and plastic.

The present door structure maintains door frame cross sectional area through mirror attachment points and provides a rigid clamping mechanism for the mirror attachment. Increased longitudinal spacing between mirror attachments may also be achieved. Additional space may be made available in the sail panel area because there is no longer a need to provide transition surfaces that consume space. Greater packaging flexibility may be achieved by implementing aspects of the present disclosure to maximize spacing between each individual mirror attachment within the door mirror sail portion.

Figure 4:
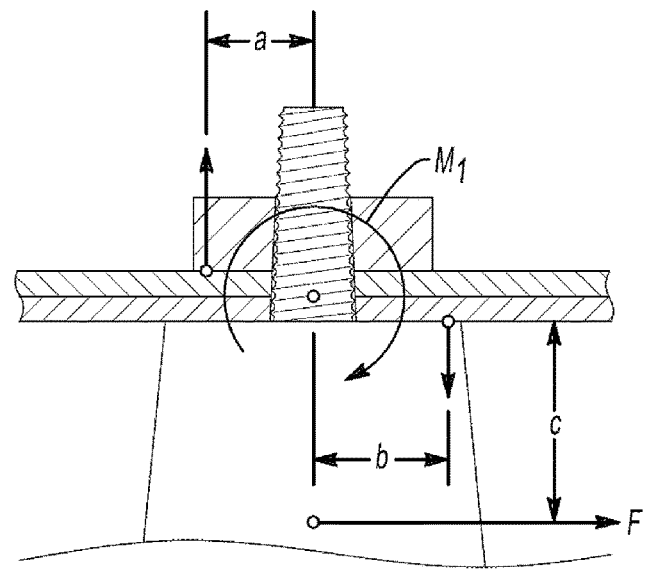
FIG. 4 is a free body diagram of one example of a prior art outside mirror fastened joint.

Referring to FIG. 4, a free body diagram illustrates reaction forces of one example of a prior art fastened mirror joint. Two door panels contact each other in a flat mating condition at the component attachment location. By way of example, a force "F" representing a service load from an attaching component is applied at a distance "c" from the attaching surface. Reaction forces in the door panel arise at the contact surfaces of the threaded joint. The reactive forces are located at offset distances "a" and "b," respectively, from a centerline of the attachment. Similarly, a reactive moment "$M_1$" is provided by the door to resist the force "F".

Figure 5:
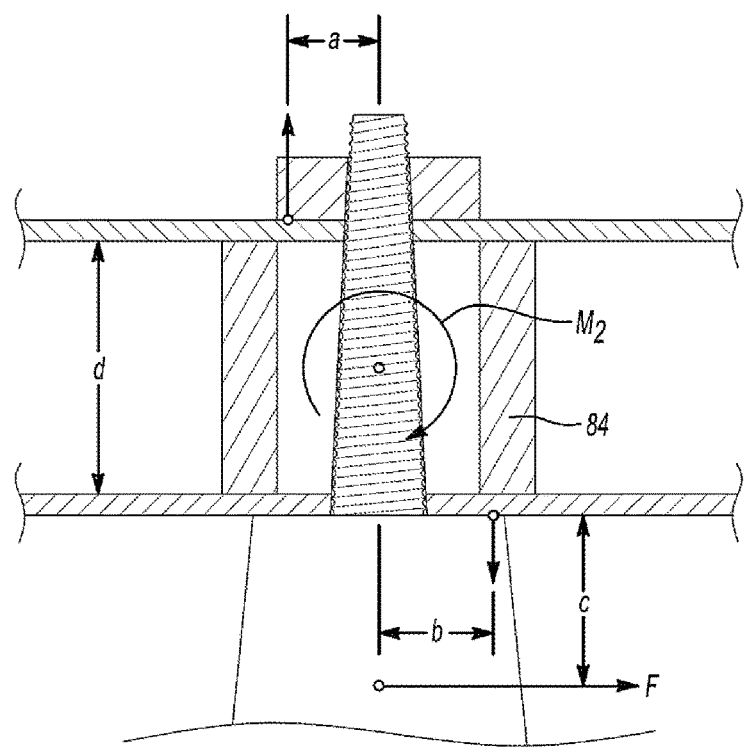
FIG. 5 is a free body diagram of an outside mirror fastened joint including an attachment collar.

Referring to FIG. 5, a free body diagram depicts a threaded joint made according to the present disclosure. The joint includes a collar 84 with a length "d" that is compressively sandwiched between two panels within the threaded joint. The same example force "F" from above is applied at the same distance "c" from the attaching surface. However, in the configuration of the present disclosure the reaction forces are reduced in magnitude compared to the prior art configuration of FIG. 4. Increased spacing of the contact points relative to an axis of rotation of the applied moment "$M_2$" reduces the magnitude of the required reaction forces. Reduced loads are imparted to the door, even when a comparable moment is applied to the joint. Increased spacing of the reaction points enhances the resistance to loads applied by component forces.

By increasing stiffness and efficiently using the shape of the door frame itself, thinner gages of material may be utilized, saving both cost and weight. The addition of collars and threaded studs may add less cost and weight compared to increasing the global thickness of an entire panel. Added cost savings and reduced assembly steps may be realized by eliminating a separate stamped mirror reinforcement part. Separate stamped reinforcements often have complex shapes that correspond to surrounding areas of the door assembly that present more alignment challenges during door construction. Structural collars sandwiched within the threaded joint may provide cost savings and reduce complexity by mass producing a standard part having a simple cylindrical shape.

Although three attachment points are illustrated by way of example other quantities and arrangements of fasteners may be suitable to retain an outside mirror on a door assembly. The externally threaded features in the illustrated embodiment are studs on the mirror received by the internally threaded securing nuts. However, this configuration may be reversed such that an externally threaded feature, such as a bolt, may be driven though the door from the inside of the vehicle into an internally threaded feature of the mirror.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle door assembly comprising:
   an outer panel attached to an inner panel defining an internal cavity surrounding a window opening;
   a plurality of cylindrical collars, each defining a bore and welded to one of the inner and outer panels within the cavity and compressively abutted against the other of the inner and outer panels; and
   a mirror assembly including a fastener extending through each bore to secure the mirror to the door assembly.

2. The vehicle door assembly of claim 1 wherein at least one of the fasteners of the mirror assembly is threaded and protrudes through both of the door assembly and one of the plurality of collars to sandwich the collars within the internal cavity.

3. The vehicle door assembly of claim 1 wherein each of the plurality of collars have a length that sets a lateral gap of the internal cavity between the inner and outer panels.

4. The vehicle door assembly of claim 1 wherein each of the inner and outer panels are formed from stamped steel having a panel thickness less than or equal to about 0.7 mm.

5. The vehicle door assembly of claim 1 wherein each of the fasteners comprises a threaded stud, and each threaded stud applies a clamp load across a collar in conjunction with a retaining nut.

6. The vehicle door assembly of claim 1 wherein each of a plurality of collars and the door assembly define a box section enclosing at least a portion of one of the fasteners.

7. A door structure having a waistline partitioning a window opening from a lower door portion, the door structure comprising:
   an outer panel defining a mirror sail area at a forward portion of the panel above the waistline;
   an inner panel joined to the outer panel at a plurality of locations and having a perimeter shape corresponding to the outer panel; and
   at least one cylindrical collar affixed within in a lateral gap between the outer and inner panels in the mirror sail area, and welded to one of the outer and inner panels and compressively abutted to the other of the outer and inner panels, wherein the at least one collar is adapted to receive a threaded stud extending from an outside mirror protruding inwardly through each of the outer panel, the collar, and the inner panel.

8. The door structure of claim 7 wherein the at least one collar further defines a length more than or equal to 10 mm that sets a distance of the lateral gap between the outer and inner panels.

9. The door structure of claim 7 wherein each of the inner and outer panels are formed from stamped steel having a panel thickness less than or equal to about 0.7 mm.

10. The door structure of claim 7 wherein the at least one collar defines an internal bore, and wherein the inner panel and the outer panel define mirror attachment holes in alignment with the internal bore of the collar.

11. A door assembly comprising:
    a door structure including an inner panel joined to an outer panel defining a waistline, a sail area at a forward portion above the waistline, and a gap between the inner and outer panels;
    a plurality of cylindrical collars and welded to one of the inner and outer panels in the gap and compressively abutted to the other of the inner and outer panels; and
    a mirror assembly having a plurality of threaded fasteners extending therefrom each protruding through a collar to retain the mirror on the door structure.

12. The door assembly of claim 11 wherein the mirror is retained to the door structure by at least one threaded joint comprising a retaining nut in cooperation with one of the plurality of threaded fasteners, and wherein the threaded joint compressively sandwiches the plurality of collars between the inner and outer panels.

13. The door assembly of claim 11 wherein each of one of the plurality of collars, the inner panel, and the outer panel cooperate to define a box section.

14. The door assembly of claim 11 wherein each of the plurality of collars defines an internal bore, and inner panel and the outer panel define mirror attachment holes in alignment with the bore of each of the plurality of collars.

* * * * *